(12) United States Patent
Cimpu et al.

(10) Patent No.: US 11,082,977 B2
(45) Date of Patent: Aug. 3, 2021

(54) METHOD AND APPARATUS FOR EVALUATING AND RANKING CHANNELS USING CONSTRAINING FACTORS IMPOSED BY INCUMBENT AND PPA PROTECTION

(71) Applicant: Telefonaktiebolaget LM Ericsson (publ), Stockholm (SE)

(72) Inventors: Virgil Cimpu, Ottawa (CA); Kumar Balachandran, Pleasanton, CA (US); Gary Boudreau, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 78 days.

(21) Appl. No.: 16/480,013

(22) PCT Filed: Jan. 16, 2018

(86) PCT No.: PCT/IB2018/050267
§ 371 (c)(1),
(2) Date: Jul. 23, 2019

(87) PCT Pub. No.: WO2018/211337
PCT Pub. Date: Nov. 22, 2018

(65) Prior Publication Data
US 2019/0373610 A1  Dec. 5, 2019

Related U.S. Application Data

(60) Provisional application No. 62/508,092, filed on May 18, 2017.

(51) Int. Cl.
*H04W 4/00* (2018.01)
*H04W 72/04* (2009.01)
*H04W 72/06* (2009.01)

(52) U.S. Cl.
CPC ....... *H04W 72/0453* (2013.01); *H04W 72/06* (2013.01)

(58) Field of Classification Search
CPC .......................... H04W 72/0453; H04W 72/06
See application file for complete search history.

(56) References Cited

U.S. PATENT DOCUMENTS

| 5,396,649 A | 3/1995 | Hamabe |
| 2016/0330743 A1 | 11/2016 | Das et al. |
| 2017/0208454 A1* | 7/2017 | Knisely ................. H04W 28/16 |

FOREIGN PATENT DOCUMENTS

| EP | 0 578 197 B1 | 1/1994 |
| EP | 2 129 139 A1 | 12/2009 |

(Continued)

OTHER PUBLICATIONS

International Search Report and Written Opinion of the International Searching Authority dated Apr. 9, 2018 issued in PCT Application No. PCT/IB2018/050267, consisting of 16 pages.

(Continued)

*Primary Examiner* — Bo Hui A Zhu
(74) *Attorney, Agent, or Firm* — Christopher & Weisberg, P. A.

(57) ABSTRACT

A network node, method and wireless device for channel assignment in a Citizens Broadband Radio Service, CBRS, band is provided. The network node includes processing circuitry configured to: map one of a plurality of channels in the CBRS band to a wireless device, the mapping of one of the plurality of channels in the CBRS band to the wireless device including: ranking the plurality of channels in the CBRS band based on a predefined maximum power per channel and a predefined maximum transmission power of a wireless device.

32 Claims, 12 Drawing Sheets

(56) References Cited

FOREIGN PATENT DOCUMENTS

| GB | 2 436 662 A | 10/2007 |
|---|---|---|
| JP | 2017-034711 A | 2/2017 |
| RU | 2009 134 088 A | 1/2011 |
| WO | 2007/117820 A2 | 10/2007 |
| WO | 2016/167845 A1 | 10/2016 |

OTHER PUBLICATIONS

Anirudha Sahoo: "Fair Resource Allocation in the Citizens Broadband Radio Service Band", Mar. 6, 2017 IEEE International Symposium on Dynamic Spectrum Access Networks (DySPAN), consisting of 2 pages.

Ericsson: "Considerations on CXM Channel Mapping", Apr. 27, 2017, consisting of 13 pages.

Russian Office Action and English translation thereof dated Mar. 24, 2020 and issued in Russian Application No. 2019129923, consisting of 12 pages.

Japanese Office Action and English summary thereof dated Sep. 18, 2020 and issued in Application Application No. 2019-540601, consisting of 10 pages.

\* cited by examiner $CBSD_1$ (maxEIRP$_1$=30dBm)

| CU | LCF | PCF | MCF | Status |
|---|---|---|---|---|
| 1 | 0 | 5 | 10 | Constrained |
| 2 | 10 | 15 | 20 | Constrained |
| 3 | 0 | 0 | 0 | Unrestricted |
| 4 | 0 | 0 | 30 | Constrained |
| 5 | 7 | 7 | 25 | Constrained |
| 6 | 5 | 20 | 50 | Constrained |
| 7 | 33 | 50 | 70 | Disabled |
| ... | | | | |
| 15 | 0 | 0 | 0 | Unrestricted |

...

$CBSD_K$ (maxEIRP$_K$=47dBm)

| CU | LCF | PCF | MCF | Status |
|---|---|---|---|---|
| 1 | 2 | 5 | 20 | Constrained |
| 2 | - | - | - | Disabled |
| 3 | - | - | - | Disabled |
| 4 | 10 | 15 | 50 | Constrained |
| 5 | 0 | 0 | 10 | Constrained |
| 6 | 30 | 50 | 70 | Constrained |
| 7 | 0 | 0 | 0 | Unrestricted |
| ... | | | | |
| 15 | 50 | 100 | 150 | Disabled |

FIG. 9

$C\_CF_{ch,c}$ for $CxM\_CS_{x,y}$

| CU | Color 1 | Color 2 | Color 3 | Color 4 |
|---|---|---|---|---|
| 1 | 0 | 0 | 0 | 0 |
| 2 | 0 | 0 | 0 | 0 |
| 3 | 0 | 35 | 0 | 0 |
| 4 | 5 | 0 | 10 | 35 |
| 5 | 10 | 0 | 10 | 10 |
| 6 | 0 | 0 | 0 | 5 |
| 7 | 6 | 3 | 1 | 10 |
| 8 | 0 | 0 | 22 | 0 |
| 9 | 0 | 17 | 0 | 0 |
| 10 | 0 | 0 | 9 | 0 |
| 11 | 0 | 7 | 0 | 0 |
| 12 | 0 | 0 | 0 | 0 |
| 13 | 0 | 0 | 0 | 0 |
| 14 | 20 | 20 | 20 | 20 |
| 15 | 0 | 0 | 10 | 1 |

Power Reduction in dB

FIG. 10

METHOD AND APPARATUS FOR EVALUATING AND RANKING CHANNELS USING CONSTRAINING FACTORS IMPOSED BY INCUMBENT AND PPA PROTECTION

CROSS-REFERENCE TO RELATED APPLICATIONS

This application is a Submission Under 35 U.S.C. § 371 for U.S. National Stage Patent Application of International Application No.: PCT/IB2018/050267, filed Jan. 16, 2018 entitled "METHOD AND APPARATUS FOR EVALUATING AND RANKING CHANNELS USING CONSTRAINING FACTORS IMPOSED BY INCUMBENT AND PPA PROTECTION," which claims priority to U.S. Provisional Application No. 62/508,092, filed May 18, 2017, entitled "METHOD AND APPARATUS FOR EVALUATING AND RANKING CHANNELS USING CONSTRAINING FACTORS IMPOSED BY INCUMBENT AND PPA PROTECTION," the entireties of both of which are incorporated herein by reference.

TECHNICAL FIELD

Wireless communications, and in particular, to a method, wireless device and network node for evaluating and ranking channels for Citizens Broadband Radio Service (CBRS) operation.

INTRODUCTION

The advance of mobile cellular networks and the popularity of wireless devices combined with the constant growth in user throughput have created a huge demand for wireless communication spectrum resources. There are three main approaches to spectrum management:
  License the spectrum to operators, who will pay significant fees for the privilege of using dedicated spectrum;
  Unlicensed spectrum where devices are sharing the same spectrum using a set of predetermined rules aimed at ensuring fair spectrum access; and
  Shared spectrum, e.g., Licensed Shared Access (LSA) or Authorized shared access (ASA), usually proposing a division of rights of use, based on time of use or geographical constraints between mobile operators and possibly an incumbent user.

A typical use of the shared spectrum scenario is to enable use of a band that is available for licensed users (e.g., wireless device, systems, etc.) in some markets, but is being restricted in others because of incumbent systems such as radar or satellite systems. Incumbent systems can be protected around the area of deployment, while authorization for mobile/wireless infrastructure can be granted in such a way that aggregate interference from mobile/wireless systems towards the incumbent systems is limited to an acceptable level of noise rise or performance degradation. In LSA, the mobile/wireless operator is licensed to operate in permitted or authorized areas, and is the reasonable regulatory approach to ASA.

The creation in the United States of America (USA) of the new Citizens Broadband Radio Service (CBRS) in the 3.5 GHz band, currently occupied by incumbent systems like Department of Defense systems, will add much-needed capacity to meet the ever-increasing demands of wireless innovation. The CBRS represents a more aggressive application of ASA to spectrum, where in addition to long-term geographic licenses shared with incumbent systems, multiple operators may also coexist in close geographical proximity to one another.

Sharing in the 3.5 GHz band occurs between three tiers of users (e.g., wireless device, systems, etc.). Access to the spectrum is governed by a Spectrum Access System (SAS) that implements a geolocation database and policy management function to be used to protect incumbents as well as implement a tiered access framework. Incumbent users (e.g., incumbent wireless devices, systems, etc.) represent the highest tier in this framework and receive interference protection from Citizens Broadband Radio Service users. Protected incumbents include the federal operations described above, as well as Fixed Satellite Service (FSS) and, for a finite period, grandfathered terrestrial wireless operations in the 3650-3700 MHz portion of the band.

The Citizens Broadband Radio Service itself consists of three tiers, Incumbent users, Priority Access and General Authorized Access (GAA) users. The last two tiers are both authorized in any given location and frequency by a SAS. As the name suggests, Priority Access operations receive protection from GAA operations. Priority Access Licenses (PALs), defined as an authorization to use a 10 MHz channel in a single census tract for three years, will be assigned in up to 70 megahertz of the 3550-3650 MHz portion of the band. GAA use will be allowed, by rule, throughout the 150 MHz band. GAA users (e.g., wireless device, systems, etc.) will receive no interference protection from other Citizens Broadband Radio Service users. The band has been designed for deployment of both small cells, and wide area macro deployments.

FIG. 1 is a block diagram of a spectrum anatomy for a 3.5 GHz Citizens Broadband Radio Service. In operation, a Citizens Broadband Radio Service Device (CBSD) will first register with the SAS and provide the CBSD's location information along with other registration parameters, and then the CBSD will request that the SAS grant access in a certain channel. Before granting access, SAS will use information from the Environmental Sensing Capability (ESC) network to detect incumbent activity from incumbent users/wireless devices in the area where the CBSD operates. SAS will also use measurement reports from the other CBSDs in the same area to determine the level of interference in a certain channel as well as if the channel needs to be protected due to PAL user activity.

FIG. 2 is a block diagram of the SAS architecture. ESC refers to Environmental Sensing Capability; CBSD refers to Citizens Broadband Radio Service Device; SAS refers to Spectrum Access System. A SAS may not need to support all interfaces, and each DBSD domain may optionally include some sensing capability including possibly an Environmental Sensing Component (ESC).

The incumbent systems in the 3550-3700 Mhz band are coastal and terrestrial radar, and Fixed Satellite Service (FSS). The coastal regions are covered by the Environmental Sensing Component (ESC) made up of a set of sensors and a detection system that will detect the presence of radar from a distance of X-65 nautical miles (approximately 120 km) from the shoreline. A detection event will cause the SAS to reconfigure CBSDs placed within defined exclusion zones near the coastline. Reconfiguration includes termination of transmission rights for a CBSD, and also includes reduction of power or reallocation of new spectrum.

The band allows the establishment of 0-7 PALs for each of over 74000 census tracts in the USA as established in the 2010 census. The PALs may be associated with spectrum allocations by the SAS within the range 3550-3650 MHz and correspond to a 10 MHz assignment per license. The SAS will try to place multiple PALs adjacent to each other if so preferred by the CBSD. A PAL user (e.g., wireless device, system, etc.) can protect a registered deployment of CBSDs within a PAL Protection Area (PPA) that is at most bounded by an area that is bounded by a contour representing a −96 dBm signal level. A PPA can overlap parts of multiple census tracts. While a PPA is atomically defined with respect to the coverage of a single CBSD, a composite PPA can be constructed by combining the coverage areas of geographically proximate CBSDs as shown in FIG. 3, i.e., FIG. 3 is a block diagram of PAL protection areas that are determined on the basis of composite coverage of associated CBSDs as a set of, e.g., vertices of a polygon located on a map.

FIG. 3 shows a PPA constructed as a set of vertices of a polygon (e.g. each vertex located as latitude, longitude and optionally an altitude above mean sea level or ground level). The PPA is restricted to lie within a coverage contour for the CBSD signal, a maximum coverage determined by the −96 dBm/10 MHz contour. All SASs are supposed to have a consistent methodology for determining coverage. The PPA is typically claimed by the CBSD towards the serving SAS and the SAS authorizes the PPA after validation of the claim against the PAL.

The SAS may only protect the PAL to an aggregate interference level of −80 dBm. In the case of an LTE deployment, this means that the usable coverage contour may be much smaller than the PPA, especially if the interference level is at the limit, and a CBSD may not be able to operate close to receiver sensitivity. A PAL is protected within the bounds of the PPA, but co-channel assignments to GAA users (e.g., wireless devices, systems, etc.) within the census tract are possible if the SAS can determine that the interference limits within the PPA will not be exceeded. Such frequency allocations may occur from several SASs, especially in census tracts within highly populated metropolitan areas. FIG. 4 is a block diagram of a protection criteria for PALs according to the 2010 census.

CBRS Alliance was formed to advocate for the use of LTE technology in the CBRS 3.5 GHz band. CBRS alliance is developing a technical report for co-existence of network and devices using LTE technology. CBRS Alliance is introducing the concept of Coexistence Manager (CxM) which will be in charge of assigning channels to CBSDs in a way that minimizes inter-CBSD interference as well as protects the incumbents and the higher tier users.

SUMMARY

Some embodiments advantageously provide a method and system for evaluating and ranking channels for Citizens Broadband Radio Service (CBRS) operation.

Coexistence in CBRS bands is still under standardization and no solution for channel mapping has been reached. The disclosure advantageously introduces constraining factors (CF) for each channel of the CBSD to help in selecting the channel for CBSD operation. The constraining factors indicate the amount of power reduction imposed for incumbent and higher tier user (e.g., wireless device, system, etc.) protection. The actual constraining factor is dependent of the number of CBSDs using the same channel, and it is unknown during channel selection. As a substitute for the actual channel constraining factor, a few other constraining factors are defined to gauge the usability of a channel and help with channel ranking for channel selection.

According to one embodiment of the disclosure, a network node for channel assignment in a Citizens Broadband Radio Service, CBRS, band, the network node comprising processing circuitry configured to: map one of a plurality of channels in the CBRS band to a wireless device, the mapping of one of the plurality of channels in the CBRS band to the wireless device including: ranking the plurality of channels in the CBRS band based on a predefined maximum power per channel and a predefined maximum transmission power of a wireless device.

According to one embodiment of this aspect, the processing circuitry is further configured to determine one of a plurality of states of each of the plurality of channels based on the ranking, each state indicating whether the predefined maximum power of the wireless device is allowed to be used in each of the plurality of channels. According to one embodiment of this aspect, the plurality of states include: an unrestricted state, the unrestricted state corresponds to a state where a transmission power of the wireless device is allowed to equal the maximum power of the channel; a constrained state, the constrained state corresponds to a state where the transmission power of the wireless device is allowed to equal a power less than the maximum power of the channel; and a disabled state, the disabled state corresponds to a state where the transmission power of the wireless device is not allowed to exceed a predefined power limit.

According to one embodiment of this aspect, the rank defines a plurality of constraining factors indicating a usability of a channel for the wireless device, each constraining factor being associated with a value corresponding to a reduction in power from the maximum transmission power of the wireless device. According to one embodiment of this aspect, the plurality of constraining factors include an individual constraining factor that assumes the wireless device is a citizens broadband radio service device, CBSD, and the only CBSD operating among interference protected entities. According to one embodiment of this aspect, the mapping of one of the plurality of channels in the CBRS band to the wireless device further includes: determining sets of management connected sets of wireless devices by: applying interference coordination groups, ICGs, to the wireless devices associated with spectrum access system, SAS, connected sets; removing graph edges between wireless devices in the same ICG; applying common channel groups, CCGs, to wireless devices in the SAS connected sets; consolidating wireless devices in the same CCGs into a graph vertex; and graph coloring the management connected sets at least in part by: mapping each vertex in the management connected set to a color; and mapping each wireless device in the management connected set to a color. One example of the management connected set is the Coexistence Manager, CxM, connected set.

According to one embodiment of this aspect, the plurality of constraining factors include a color constraining factor that assumes the wireless device is a citizens broadband radio service device, CBSD, and the among several other CBSDs operating in a channel assigned to a color from the graph coloring. According to one embodiment of this aspect, the plurality of constraining factors include a worst-case constraining factor that assumes the wireless device is a citizens broadband radio service device, CBSD, and the that the remaining CBSDs of the management connected sets are operating on a same channel of the plurality of channels.

According to another aspect of the disclosure, a method for a network node for channel assignment in a Citizens Broadband Radio Service, CBRS, band is provided. One of a plurality of channels in the CBRS band is mapped to a wireless device. The mapping of one of the plurality of channels in the CBRS band to the wireless device includes ranking the plurality of channels in the CBRS band based on a predefined maximum power per channel and a predefined maximum transmission power of a wireless device.

According to one embodiment of this aspect, one of a plurality of states of each of the plurality of channels is determined based on the ranking, each state indicating whether the predefined maximum power of the wireless device is allowed to be used in each of the plurality of channels. According to one embodiment of this aspect, the plurality of states includes: an unrestricted state, the unrestricted state corresponds to a state where a transmission power of the wireless device is allowed to equal the maximum power of the channel; a constrained state, the constrained state corresponds to a state where the transmission power of the wireless device is allowed to equal a power less than the maximum power of the channel; and a disabled state, the disabled state corresponds to a state where the transmission power of the wireless device is not allowed to exceed a predefined power limit.

According to one embodiment of this aspect, the rank defines a plurality of constraining factors indicating a usability of a channel for the wireless device, each constraining factor being associated with a value corresponding to a reduction in power from the maximum transmission power of the wireless device.

According to one embodiment of this aspect, the plurality of constraining factors include an individual constraining factor that assumes the wireless device is a citizens broadband radio service device, CBSD, and the only CBSD operating among interference protected entities. According to one embodiment of this aspect, the mapping of one of the plurality of channels in the CBRS band to the wireless device further includes: determining sets of management connected sets of wireless devices by: applying interference coordination groups, ICGs, to the wireless devices associated with spectrum access system, SAS, connected sets; removing graph edges between wireless devices in the same ICG; applying common channel groups, CCGs, to wireless devices in the SAS connected sets; and consolidating wireless devices in the same CCGs into a graph vertex. The mapping of one of the plurality of channels in the CBRS band to the wireless device further includes: graph coloring the management connected sets at least in part by: mapping each vertex in the management connected set to a color; and mapping each wireless device in the management connected set to a color.

According to one embodiment of this aspect, the plurality of constraining factors include a color constraining factor that assumes the wireless device is a citizens broadband radio service device, CBSD, and the among several other CBSDs operating in a channel assigned to a color from the graph coloring. According to one embodiment of this aspect, the plurality of constraining factors include a worst-case constraining factor that assumes the wireless device is a citizens broadband radio service device, CBSD, and the that the remaining CBSDs of the management connected sets are operating on a same channel of the plurality of channels.

According to another aspect of the disclosure, a wireless device for channel assignment in a Citizens Broadband Radio Service (CBRS) band is provided. The wireless device includes processing circuitry configured to: receive a mapping of one of a plurality of channels in the CBRS band to a wireless device. The mapping of one of the plurality of channels in the CBRS band to the wireless device is based on a ranking the plurality of channels in the CBRS band that is based on a predefined maximum power per channel and a predefined maximum transmission power of the wireless device.

According to one embodiment of this aspect, the one of the plurality of channels is in one of a plurality of states based on the ranking, each state indicating whether the predefined maximum power of the wireless device is allowed to be used in each of the plurality of channels. According to one embodiment of this aspect, the plurality of states includes: an unrestricted state, the unrestricted state corresponds to a state where a transmission power of the wireless device is allowed to equal the maximum power of the channel; a constrained state, the constrained state corresponds to a state where the transmission power of the wireless device is allowed to equal a power less than the maximum power of the channel; and a disabled state, the disabled state corresponds to a state where the transmission power of the wireless device is not allowed to exceed a predefined power limit.

According to one embodiment of this aspect, the rank defines a plurality of constraining factors indicates a usability of a channel for the wireless device, each constraining factor being associated with a value corresponding to a reduction in power from the maximum transmission power of the wireless device. According to one embodiment of this aspect, the plurality of constraining factors include an individual constraining factor that assumes the wireless device is a citizens broadband radio service device, CBSD, and the only CBSD operating among interference protected entities.

According to one embodiment of this aspect, the mapping of one of the plurality of channels in the CBRS band to the wireless device is based on: determining sets of management connected sets of wireless devices by: applying interference coordination groups, ICGs, to the wireless devices associated with spectrum access system, SAS, connected sets; removing graph edges between wireless devices in the same ICG; applying common channel groups, CCGs, to wireless devices in the SAS connected sets; and consolidating wireless devices in the same CCGs into a graph vertex. The mapping further includes graph coloring the management connected sets at least in part by: mapping each vertex in the management connected set to a color; and mapping each wireless device in the management connected set to a color. According to one embodiment of this aspect, the plurality of constraining factors include a color constraining factor that assumes the wireless device is a citizens broadband radio service device, CBSD, and the among several other CBSDs operating in a channel assigned to a color from the graph coloring.

According to one embodiment of this aspect, the plurality of constraining factors include a worst-case constraining factor that assumes the wireless device is a citizens broadband radio service device, CBSD, and the that the remaining CBSDs of the management connected sets are operating on a same channel of the plurality of channels. According to another embodiment of this aspect, a method for a wireless device for channel assignment in a Citizens Broadband Radio Service, CBRS, band is provided. A mapping of one of a plurality of channels in the CBRS band to a wireless device is received. The mapping of one of the plurality of channels in the CBRS band to the wireless device is based on a ranking the plurality of channels in the CBRS band that is based on a predefined maximum power per channel and a predefined maximum transmission power of the wireless device.

According to one embodiment of this aspect, the one of the plurality of channels is in one of a plurality of states based on the ranking, each state indicates whether the predefined maximum power of the wireless device is allowed to be used in each of the plurality of channels. According to one embodiment of this aspect, the plurality of states includes: an unrestricted state, the unrestricted state corresponds to a state where a transmission power of the wireless device is allowed to equal the maximum power of the channel; a constrained state, the constrained state corresponds to a state where the transmission power of the wireless device is allowed to equal a power less than the maximum power of the channel; and a disabled state, the disabled state corresponds to a state where the transmission power of the wireless device is not allowed to exceed a predefined power limit.

According to one embodiment of this aspect, the rank defines a plurality of constraining factors indicating a usability of a channel for the wireless device, each constraining factor being associated with a value corresponding to a reduction in power from the maximum transmission power of the wireless device. According to one embodiment of this aspect, the plurality of constraining factors include an individual constraining factor that assumes the wireless device is a citizens broadband radio service device, CBSD, and the only CBSD operating among interference protected entities.

According to one embodiment of this aspect, the mapping of one of the plurality of channels in the CBRS band to the wireless device is based on: determining sets of management connected sets of wireless devices by: applying interference coordination groups, ICGs, to the wireless devices associated with spectrum access system, SAS, connected sets; removing graph edges between wireless devices in the same ICG; applying common channel groups, CCGs, to wireless devices in the SAS connected sets; and consolidating wireless devices in the same CCGs into a graph vertex. The mapping further includes graph coloring the management connected sets at least in part by: mapping each vertex in the management connected set to a color; and mapping each wireless device in the management connected set to a color. According to one embodiment of this aspect, the plurality of constraining factors include a color constraining factor that assumes the wireless device is a citizens broadband radio service device, CBSD, and the among several other CBSDs operating in a channel assigned to a color from the graph coloring. According to one embodiment of this aspect, the plurality of constraining factors include a worst-case constraining factor that assumes the wireless device is a citizens broadband radio service device, CBSD, and that the remaining CBSDs of the management connected sets are operating on a same channel of the plurality of channels.

According to another aspect of the disclosure, a network node for channel assignment in a Citizens Broadband Radio Service, CBRS, band is provided. The network node includes a mapping module configured to map one of a plurality of channels in the CBRS band to a wireless device, the mapping of one of the plurality of channels in the CBRS band to the wireless device including: ranking the plurality of channels in the CBRS band based on a predefined maximum power per channel and a predefined maximum transmission power of a wireless device.

According to one embodiment of this aspect, a wireless device for channel assignment in a Citizens Broadband Radio Service, CBRS, band is provided. The wireless device includes a receiving module configured to receive a mapping of one of a plurality of channels in the CBRS band to a wireless device, the mapping of one of the plurality of channels in the CBRS band to the wireless device being based on a ranking the plurality of channels in the CBRS band that is based on a predefined maximum power per channel and a predefined maximum transmission power of the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is an example of channel ranking tables in accordance with the principles of the disclosure;

FIG. 10 is an example of a constraining factor color matrix in accordance with the principles of the disclosure;

DETAILED DESCRIPTION

Figure 1:
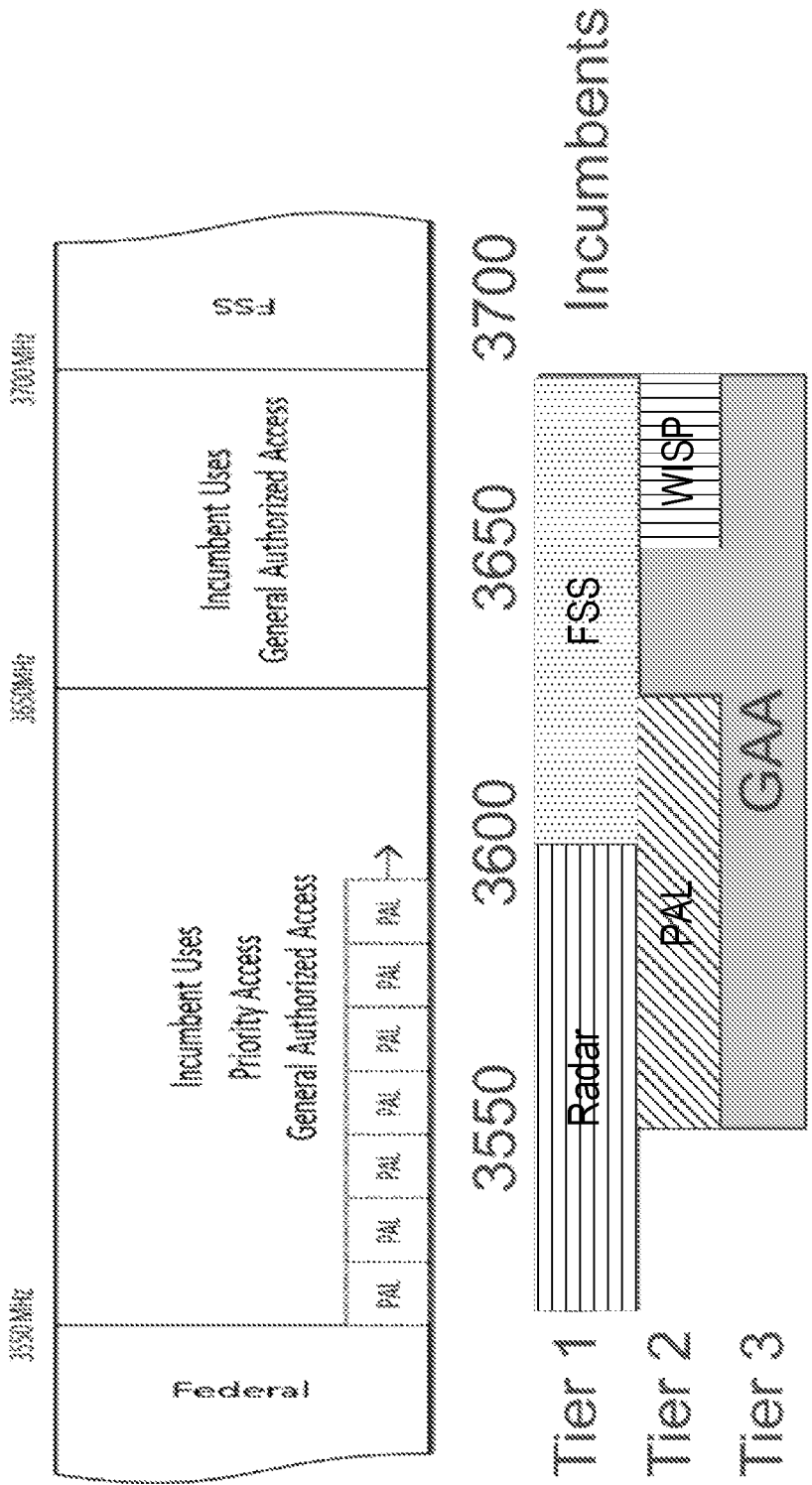
FIG. 1 is a block diagram of a spectrum anatomy for the 3.5 GHz Citizens Broadband Radio Service.
Figure 2:
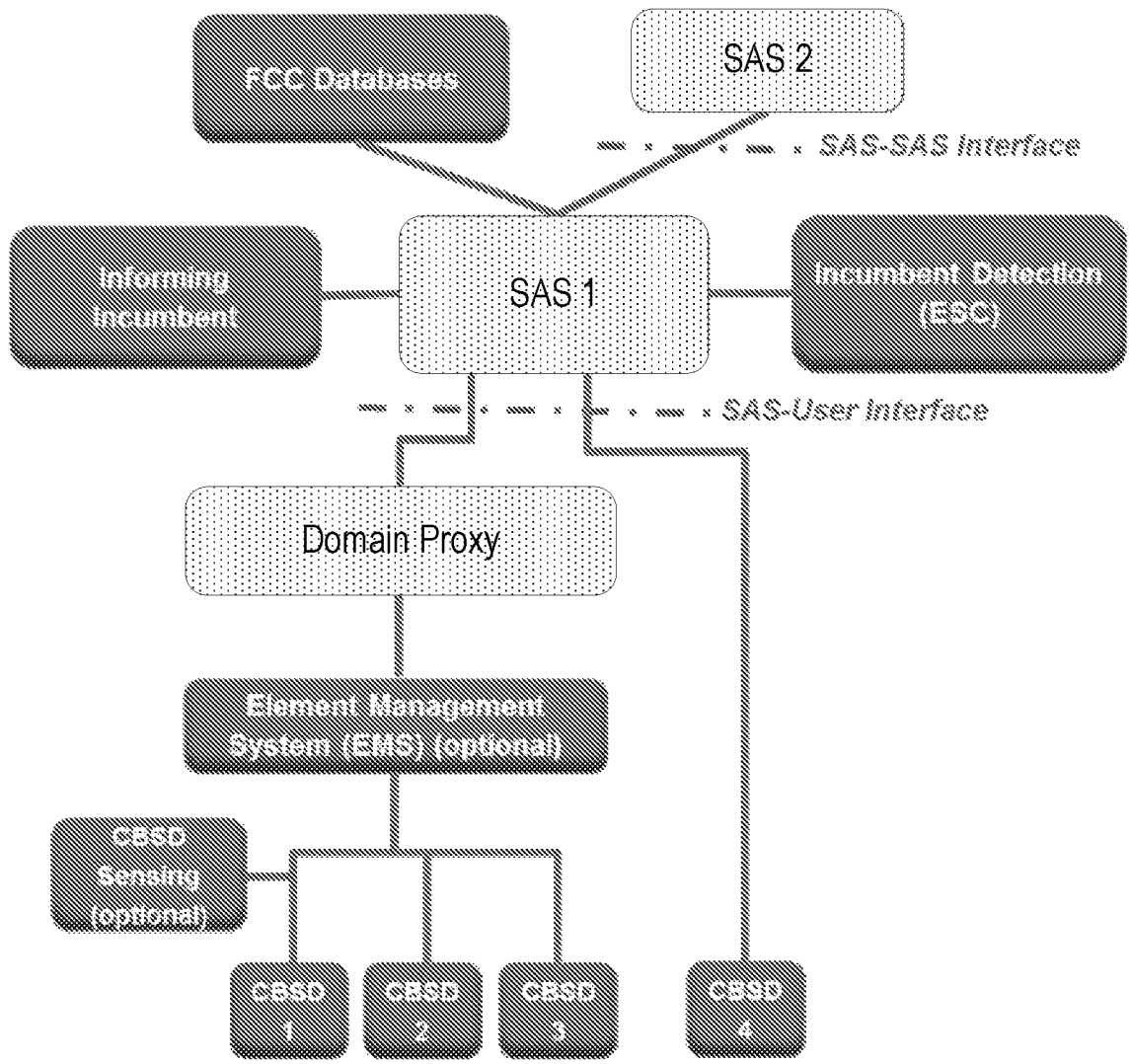
FIG. 2 is a block diagram of the SAS architecture.
Figure 3:
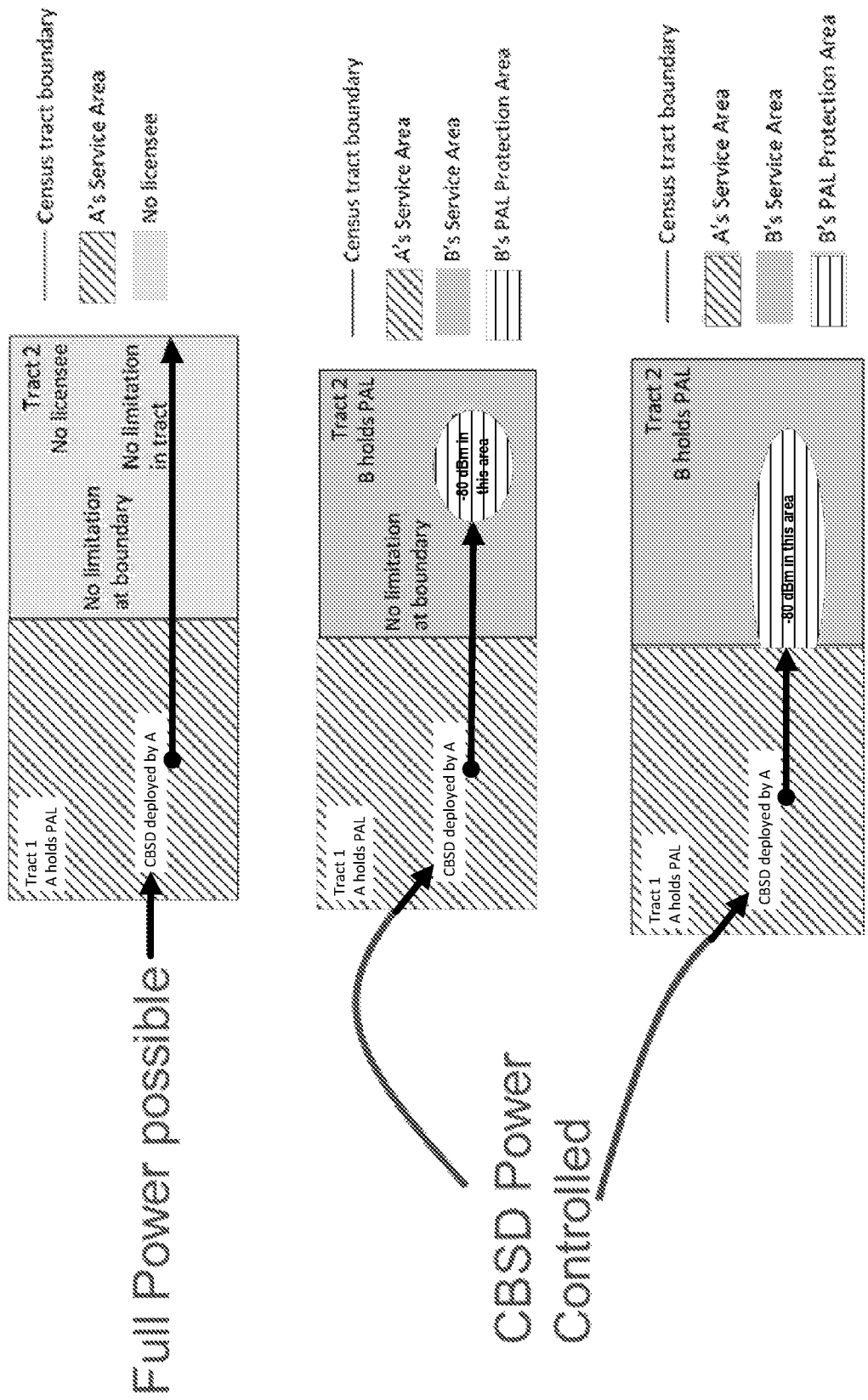
FIG. 3 is a block diagram of PAL protection areas that are determined on the basis of composite coverage of associated CBSDs as a set of, e.g., vertices of a polygon located on a map.
Figure 4:
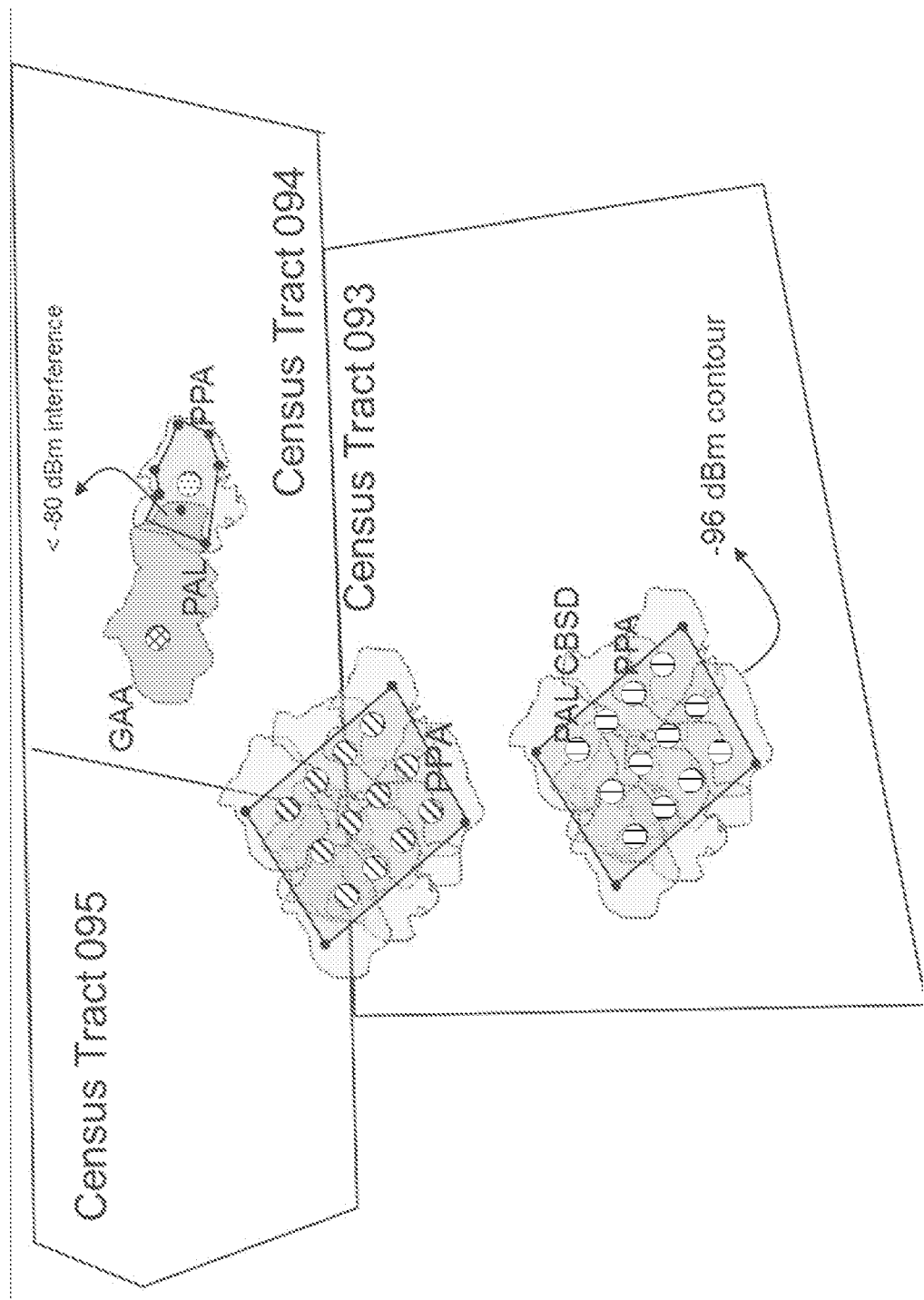
FIG. 4 is a block diagram of a protection criteria for PALs according to the report and order.

The instant disclosure advantageously provides channel selection/assignment that is a factor for enabling successful commercial deployments in the Citizens Broadband Radio Service (CBRS) band. For example, in shared spectrum deployments, there may be tiered service levels where incumbent devices (wireless devices associated with incumbent entities) represent the highest tier and receive interference protection from CBRS wireless devices. In other words, incumbent entities impose power limitation on CBRS wireless devices due to the interference protection afforded to incumbent entities, i.e., while a CBRS wireless device may be able to transmit at Power Px, this device may be configured to transmit at a lower power due to these incumbent protections. In one or more embodiments, the teachings of the disclosure are applied to one or more lower tiered users such as Priority Access Licenses (PALs) and/or General Authorized Access (GAA) users/wireless devices using the CBRS band in order to help reduce and/or prevent these lower tiered wireless devices from interfering with incumbent user/wireless devices.

The disclosure advantageously provides one or more constraining factors for each channel of the CBSD where the constraining factors indicate an amount of power reduction to be applied to the CBSD in order to meet protection(s) (e.g., interference protection) imposed by the higher tier user (i.e., imposed by incumbent users/wireless devices). Since the actual constraining factor is dependent on the number of CBSDs using the same channel (which is determinable after channel selection), the actual containing factors remain unknown during channel selection. The disclosure advantageously provides one or more estimated constraining factors to gauge the usability of a channel and to help with channel ranking during channel selection. Further, the instant disclosure enables a faster channel selection/channel assignment process for the CBRS 3.5 GHz band, where the channels are ranked based on the constraining factors.

Before describing in detail exemplary embodiments, it is noted that the embodiments reside primarily in combinations of components and processing steps related to methods, network nodes and wireless devices for evaluating and ranking channels for Citizens Broadband Radio Service (CBRS) operation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 5:
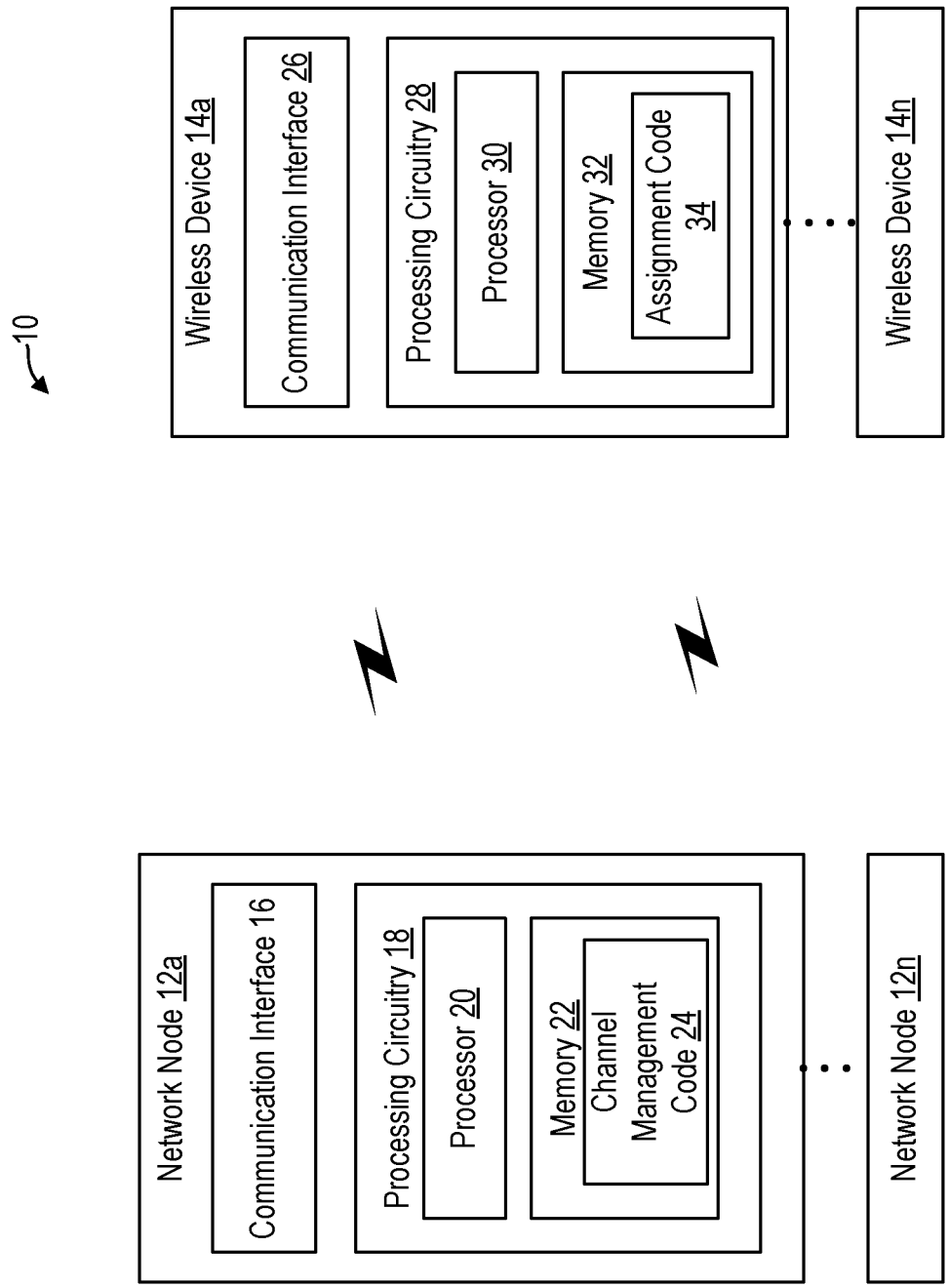
FIG. 5 is a block diagram of an exemplary system for evaluating and ranking channels for Citizens Broadband Radio Service (CBRS) operation in accordance with the principles of the disclosure.

Referring now to drawing figures in which like reference designators refer to like elements there is shown in FIG. 5 is a block diagram of an exemplary system 10 for evaluating and ranking channels for Citizens Broadband Radio Service (CBRS) operation in accordance with the principles of the disclosure. System 10 includes one or more network nodes 12a-12n and one or more wireless devices 14a-14, in communication with each other via one or more communication networks, paths and/or links using one or more communication protocols, as described herein. As used herein, network node 12 refers to one or more of network nodes 12a-12n, and wireless device 14a-14n refers to one or more wireless devices 14.

Network node 12 includes communication interface 16 for communicating with wireless device 14 and other elements/entities in system 10. In one or more embodiments, communication interface 16 is replaced with or includes transmitter and/or receiver.

Network node 12 includes processing circuitry 18. Processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communications, e.g., configuration and/or address data of nodes, etc.

Processing circuitry 18 may be configured to control any of the methods and/or processes described herein and/or to cause such methods, signaling and/or processes to be performed, e.g., by network node 12. Processor 20 corresponds to one or more processors 20 for performing network node 12 functions described herein. Network node 12 includes memory 22 that is configured to store data, programmatic software code and/or other information described herein. In one or more embodiments, memory 22 is configured to store channel management code 24. For example, channel management code 24 includes instructions that, when executed by processor 20, causes processor 20 to perform the functions described herein such as the functions described with respect to FIG. 6. Further, one or more of the functions and/or process performed by network node 12 may be performed by another network node 12 and/or other device such as in a cloud computing environment.

In one or more embodiments, network node 12 is any kind of network node comprised in a radio network which may further comprise any of base station (BS), radio base station, base transceiver station (BTS), base station controller (BSC), radio network controller (RNC), evolved Node B (eNB or eNodeB), Node B, gNodeB (gNB), multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Wireless device 14 includes communication interface 26 for communicating with network node 12 and other elements/entities in system 10. In one or more embodiments, communication interface 26 is replaced with or includes transmitter and/or receiver.

Wireless device 14 includes processing circuitry 28. Processing circuitry 28 includes processor 30 and memory 32. In addition to a traditional processor and memory, processing circuitry 28 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communications, e.g., configuration and/or address data of nodes, etc.

Processing circuitry 28 may be configured to control any of the methods and/or processes described herein and/or to cause such methods, signaling and/or processes to be performed, e.g., by wireless device 14. Processor 30 corresponds to one or more processors 30 for performing wireless device 14 functions described herein. Wireless device 14 includes memory 32 that is configured to store data, programmatic software code and/or other information described herein. In one or more embodiments, memory 32 is configured to store assignment code 34. For example, assignment code 34 includes instructions that, when executed by processor 30, causes processor 30 to perform the functions described herein such as the functions described with respect to FIG. 11. In one or more embodiments, wireless device 14 may be a radio communication device, CBSD, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Figure 6:
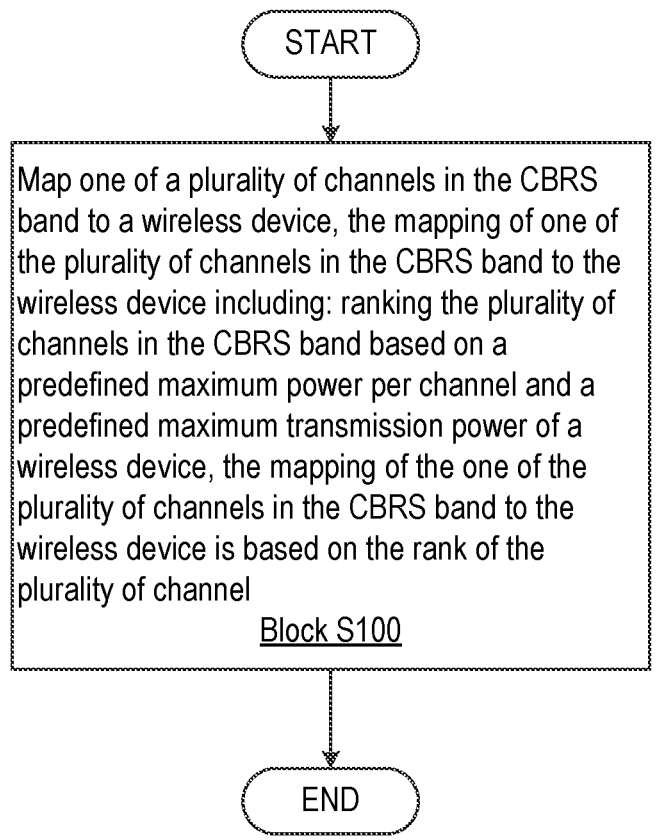
FIG. 6 is a flow diagram of an exemplary channel management process of channel management code in accordance with the principles of the disclosure.

FIG. 6 is a flow diagram of an exemplary channel management process of channel management code 24 in accordance with the principles of the disclosure. Processing circuitry 18 is configured to map one of a plurality of channels in the CBRS band to a wireless device 14 where the mapping of one of the plurality of channels in the CBRS band to the wireless device 14 includes ranking the plurality of channels in the CBRS band based on a predefined maximum power per channel and a predefined maximum transmission power of a wireless device 14, as described herein (Block S100).

In one or more embodiments, processing circuitry 18 is configured to determine a state of a channel unit based on a channel mapping. In one or more embodiments, the channel mapping includes determining a channel ranking for each wireless device 14, and/or mapping of wireless devices 14 to channel units, as described herein. If the determined state of the channel unit is a first state, processing circuitry 18 selects a first channel for the wireless device for CBRS operation, the first channel having at least one restriction. The selection is communicated to wireless device 14 for implementation by wireless device 14.

In one or more embodiments, the first state is a constrained state, where the constrained state is limited by an effective isotropic radiated power (EIRP) restriction. In one or more embodiments, the state of the channel unit is one of unrestricted, constrained and disabled. In one or more embodiments, the channel mapping includes determining a channel ranking for the wireless device.

In one or more embodiments, the channel ranking is based on a constraining factor (CF) where the constraining factor is limited by at least one of individual CF, color CF and worst-case CF. The individual CF considers only the wireless device. The color CF considers only wireless devices assigned to a same color by a graph color algorithm. As used herein, the term "graph color" refers to graph labeling in which labels are assigned to graph elements subject to one or more constraints. In other words, the "colors" referred to herein are not limited to colors in the traditional sense, e.g., red, blue, etc., and other properties which produce certain sensations on the eyes. The worst-case CF considers all wireless devices that are assigned to the same channel. In one or more embodiments, if the determined state of the channel unit is a second state, selection of a channel for the wireless device for CBRS operation is prevented.

In one or more embodiments, the second state is a disabled state. The disabled state indicates the channel cannot be used by the wireless device for CBRS operation. In one or more embodiments, if the determined state of the channel unit is a third state, a third channel for CBRS operation is selected where the third channel having no effective isotropic radiated power (EIRP) restriction.

In one or more embodiments, the channel mapping analyzes at least one mapping parameter, the at least one SAS parameter and at least one CxM parameter. The at least one SAS parameter includes at least one of SAS connected set, interference coordination groups (ICGs) and list of protected entities impacted by CBSD. The at least one CxM parameter includes at least one of CxM connected sets and mapping of colors to CBSDs.

Channel Ranking is used as part of CxM Primary channel mapping, i.e., channel mapping. In one or more embodiments, channel mapping may use the following inputs:
From SAS:
  SAS Connected Set: $SAS\_CS_x$
  Interference Coordination Groups (ICGs)
  Common Channel Groups (CCGs)
From CxM Spectrum Assignment Algorithm:
  CxM Connected Sets: $CxM\_CS_{x,y}$
  Nr of colors required to color each $CxM\_CS_{x,y}$
  Mapping of Colors to CBSDs: Color→CBSD
Extra Info from SAS:
  List of Protected Entities (PE) impacted by CBSDs in $SAS\_CS_x$
  For each protected entity $PE_p$:
    Protected Channel Units ch
    Interference Threshold per channel $Q_{p,ch}$
    List of CBSDs impacting the protected entity: $N_p$
The output of the Channel mapping:
Channel Ranking for each CBSD
Mapping of CBSDs to Channel Units:
  CBSD→CU
The channel mapping steps are:
1. CxM processes the Connected Set $SAS\_CS_x$ received from SAS and produces a set of CxM Connected Sets $CxM\_CS_{x,y}$;
   a. Apply ICGs and remove edges between CBSDs in the same ICG;
   b. Apply CCGs and consolidate the CBSDs in the same CCG into a graph vertex;

2. CxM does graph coloring of the CxM Connected Sets;
   a. Determine the number of required colors;
   b. Map each vertex in the CxM connected set to a color;
   c. Map each CBSD to a Color;
3. For each CBSD, rank the available channels;
4. Determine how much bandwidth (BW) can be allocated to each color;
   a. The number of available channels is potentially different for each CBSD;
5. For each CBSD, assign the primary channels that are recommended to be used by that CBSD;
6. For each CBSD, determine if there are any channels available to BW expansion.

Channel ranking will evaluate each channel, in terms of incumbent protection requirements, and channel ranking will determine the state of the channel to be one of Unrestricted, Constrained and Disable.

To determine the state of each channel unit:
For each CBSD and channel unit ch, the maxAllowedEMP$_{cbsd,ch}$ that can be used in channel (CU or ch) by CBSD is estimated given the Interference Margin Protection requirements against all higher tier wireless devices
  The maxEIRP$_{cbsd,ch}$ is based on CatA/CatB max power or the maximum declared EIRP during registration
  Usually the maxEIRP$_{cbsd,ch}$=maxEIRP$_{cbsd}$ (i.e., the declared max power per channel unit is equal with the declared max power per CBSD).
CU_Status$_{cbsd,ch}$ is defined as:
Unrestricted (maxAllowedEIRP$_{cbsd,ch}$=maxEIRP$_{cbsd,ch}$), i.e., unrestricted state;
  The CBSD can use the max EIRP in this channel with no restriction regarding higher tier protection;
Constrained (maxAllowedEIRP$_{cbsd,ch}$<maxEIRP$_{cbsd,ch}$), i.e., constrained state;
  The CBSD max EIRP will be limited due to higher tier protection;
  The constraining factor is computed;
Disabled, i.e., disabled state;
  The channel cannot be used by the CBSD (for example the CBSD is inside a PAL protection area (PPA) and the channel is a PAL channel used by the PPA);

To determine the constrained channels, constraining factor(s) are introduced. A Constraining Factor (CF) is a number, expressed in dB, that shows how much the output power of a CBSD has to be reduced in order to protect higher tiers. For each CBSD and CU ch:

$$CF_{cbsd,ch} = \text{MaxEIRP}_{cbsd,ch} - \text{MaxAllowedEIRP}_{cbsd,ch}$$

The true (actual) constraining factor can only be properly calculated when the channel assignments are known for all CBSDs. What can be computed, during the channel assignment/selection process, are some limits for the constraining factor such as to provide for the calculation of estimated CF(s). For each CU channel and CBSD cbsd, compute the following:
Individual CF
  CF when considering only the current CBSD;
Color CF
  CF when considering only the CBSDs assigned to the same color by the graph coloring algorithm;
Worst Case CF
  CF when considering ALL CBSD are assigned to the same channel ch;

Individual CF (I_CF)
Computation is performed as if this is the only CBSD operating in the channel ch (N=1). Entities as used herein refers to wireless devices, systems, etc.
Step 1: Compute the interference from CBSD cbsd towards all applicable higher tier protected entities (points/areas) active in channel ch;
  Determine all Protected Entities (PE) active in channel ch that are impacted by the CBSD cbsd. Let N_PE$_{cbsd,ch}$ be the number of impacted protected entities
  Let PL$_{cbsd,p,ch}$ be the path loss between CBSD cbsd and Protected Entity p in channel ch
  Let Q$_{p,ch}$ be the interference quota (threshold) for PE p in channel ch
  Then I$_{cbsd,p,ch}$=MaxEIRP$_{cbsd,ch}$-PL$_{cbsd,p,ch}$
Step 2: Compute CF for each impacted PE p
  If I$_{cbsd,p,ch}$<=Q$_{p,ch}$=>I_CF$_{cbsd,p,ch}$=0, otherwise
  I_CF$_{cbsd,p,ch}$=I$_{cbsd,p,ch}$-Q$_{p,ch}$
Step 3: Compute overall CF for CBSD cbsd and channel ch
  I_CF$_{cbsd,ch}$=max(I_CF$_{cbsd,p,ch}$), where p in [1, N_PE$_{cbsd,ch}$]

Figure 7:
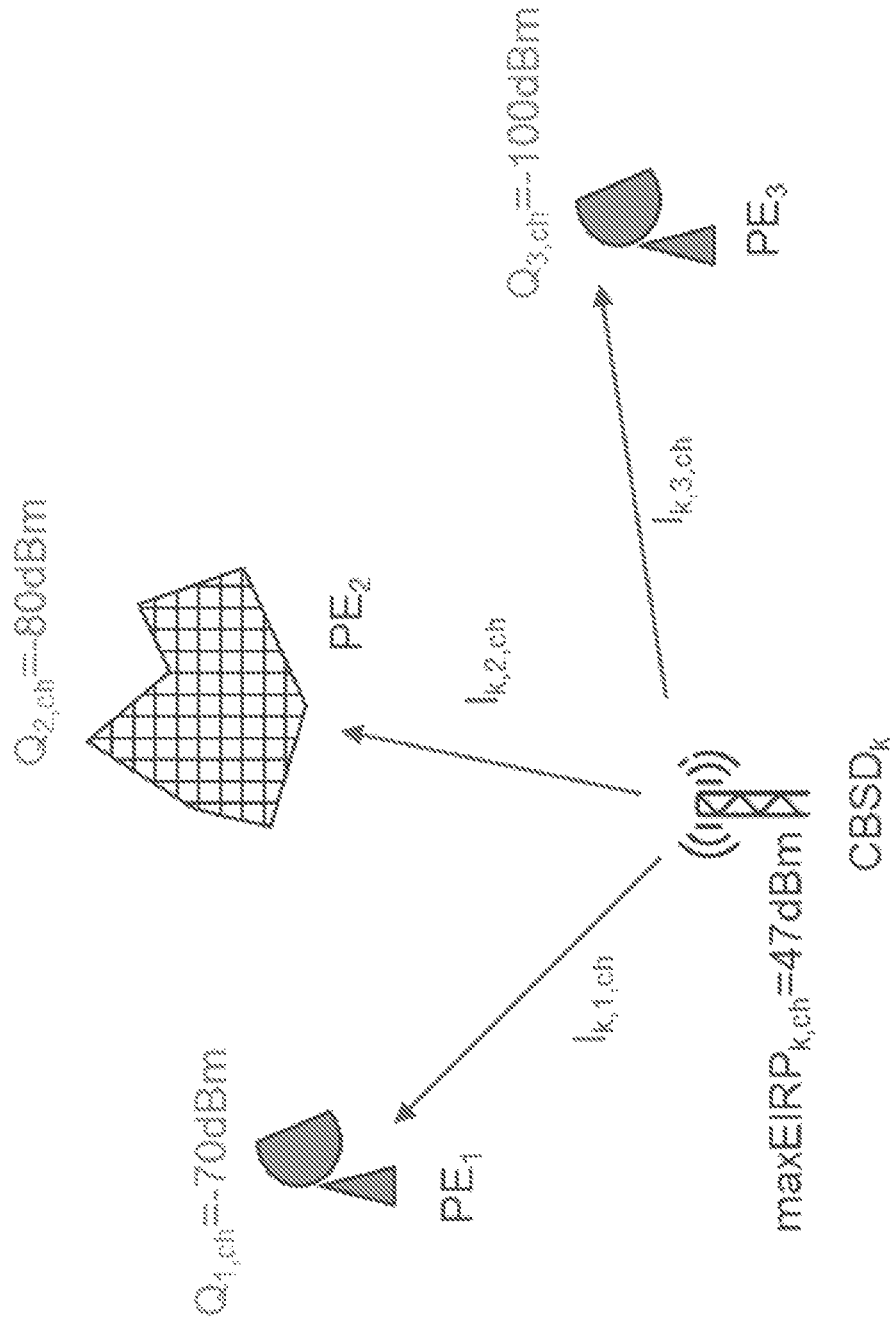
FIG. 7 is block diagram of computation performed for individual CF in accordance with the principles of the disclosure.

FIG. 7 is block diagram of a computation performed for individual CF in accordance with the principles of the disclosure. As illustrated in FIG. 7, only one CBSD is assumed to be operating in channel ch.

Color CF (C_CF)
The color CF computation done as if the only CBSDs, operating in the channel ch, are the ones assigned to color c.
Step 1: For each PE p impacted by one or more CBSDs assigned to color c
  Determine the CBSDs, assigned to color c, impacting the PE p: N$_{p,c}$
  For each CBSD cbsd within N$_{p,c}$:
    Compute the interference from CBSD cbsd towards PE p active in channel ch:
    I$_{cbsd,p,ch}$=MaxEIRP$_{cbsd,ch}$-PL$_{cbsd,p,ch}$
    If I$_{cbsd,p,ch}$<=(Q$_{p,ch}$/N$_{p,c}$)=>C_CF$_{cbsd,p,ch,c}$=0, otherwise
    C_CF$_{cbsd,p,ch,c}$=I$_{cbsd,p,ch}$-(Q$_{p,ch}$/N$_{p,c}$)
Step 2: Compute color CF for CBSD cbsd, channel ch and color c:
  C_CF$_{cbsd,ch,c}$=max(C_CF$_{cbsd,p,ch,c}$) where p is in the list of impacted PEs.
Step 3: Compute the overall color CF for channel ch and color c:
  C_CF$_{ch,c}$=max(C_CF$_{cbsd,ch,c}$) where cbsd is in the list of CBSDs assigned to color c.

Worst Case/MAX CF (M_CF)
The worst-case CF computation is performed assuming all CBSDs are operating in channel ch.
Step 1: Determine all Protected Entities active in channel ch that are impacted by the CBSD cbsd. Let N_PE$_{cbsd,ch}$ be the number of impacted PEs.
Step 2: For each PE p within N_PE$_{cbsd,ch}$:
  Determine all the CBSDs impacting the PE p: N$_p$
  Compute the interference I$_{cbsd,p,ch}$=maxEIRP$_{cbsd,ch}$-PL$_{cbsd,p,ch}$ from CBSD cbsd towards PE p active in channel ch
  If I$_{cbsd,p,ch}$<=(Q$_{p,ch}$/N$_p$)=>M_CF$_{cbsd,p,ch}$=0, otherwise $$M\_CF_{cbsd,p,ch} = I_{cbsd,p,ch} - (Q_{p,ch}/N_p)$$

Step 3: Compute max CF for CBSD cbsd and channel ch:
  M_CF$_{cbsd,ch}$=max(M_CF$_{cbsd,p,ch}$) where p in [1, N_PE$_{cbsd,ch}$]

Figure 8:
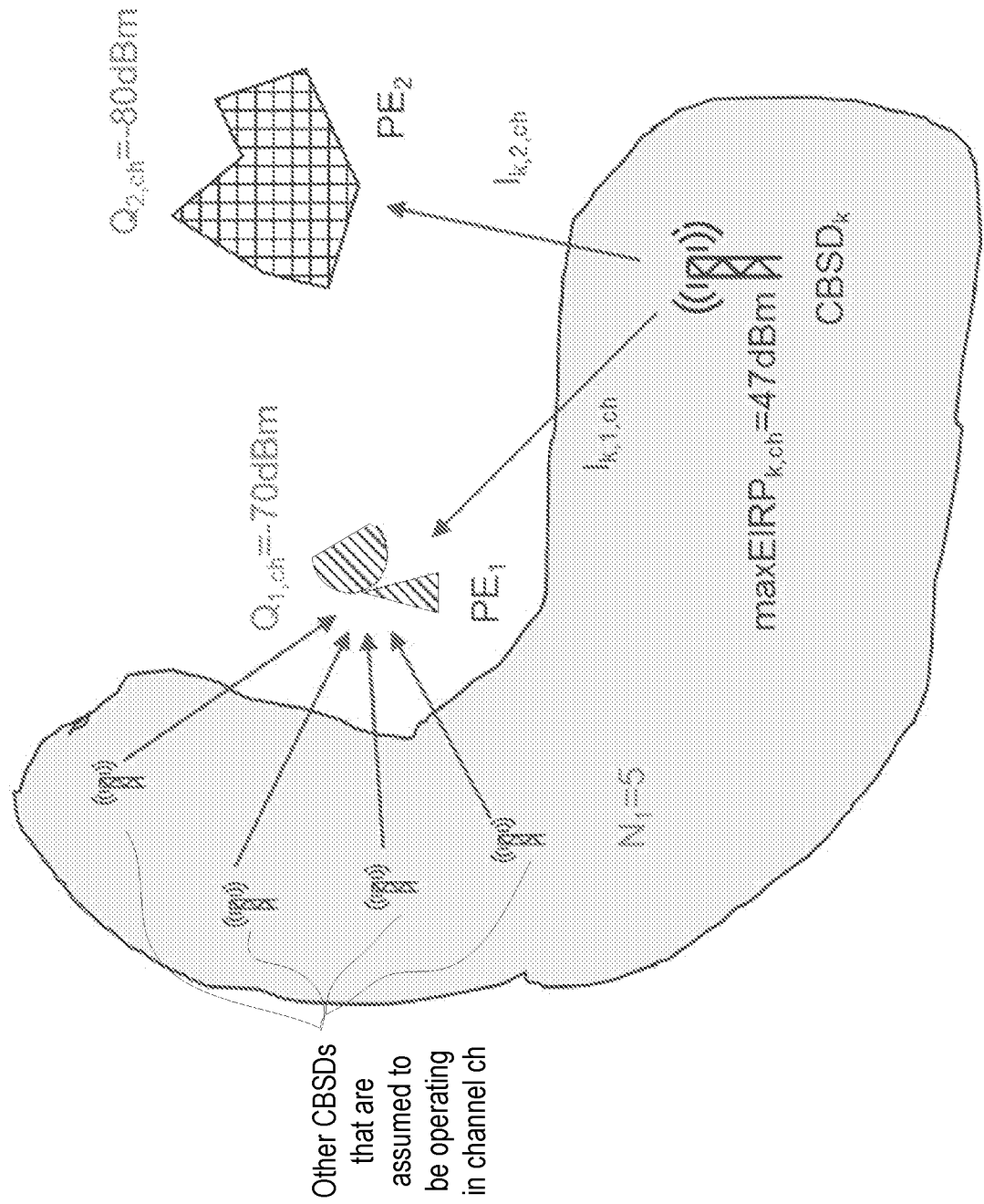
FIG. 8 is a diagram of an example of the computation performed for Max CF in accordance with the principles of the disclosure.

FIG. 8 is a diagram of an example of the computation performed for worst case Max CF in accordance with the principles of the disclosure. As illustrated, all CBSDs (total of five in this example, $N_1=5$) are assumed to be operating in channel ch.

Disabled Channels

In one or more embodiments, CBRS may have an Adjacent Channel Leakage Ratio (ACLR) requirement or limit of −13 dB/MHz. This is equivalent with −3 dBm/10 MHz. In one or more embodiments, CBRS may have an interference limit into adjacent channels such as an interference limit of −13 dB. A channel should be considered disabled, if the CBSD cannot operate with an output EIRP lower than a predefined value such as −3 dBm/10 MHz:

maxAllowedEIRP$_{cbsd,ch}$<=−3 dBm

For a CBSD cbsd, a channel unit ch shall be considered disabled if:

maxE/RP$_{cbsd,ch}$−I_CF$_{cbsd,ch}$<=−3 dBm

This is equivalent to: for a CBSD cbsd, a channel unit ch shall be considered disabled if the Individual CF is greater than:

Cat A: I_CF$_{cbsd,ch}$>=33 dB
Cat B: I_CF$_{cbsd,ch}$>=50 dB

Channel Ranking

Considerations regarding Channel Ranking:

I_CF$_{cbsd,ch}$<=C_CF$_{cbsd,ch}$<=M_CF$_{cbsd,ch}$

If M_CF$_{cbsd,ch}$=0=>channel ch is marked as unrestricted for CBSD cbsd.

If maxEIRP$_{cbsd,ch}$−I_CF$_{cbsd,ch}$<=−3 dBm=>channel is marked as disabled.

When possible, it is desirable to allocate unrestricted channels to CBSDs.

FIG. 9 is an example of channel ranking tables in accordance with the principles of the disclosure. The values in the table indicate an amount of power reduction in dB to be enforced on a CBSD if the CBSD is assigned a specific channel. As illustrated, different CFs may provide the same or different values for the same channel.

Considerations regarding Channel Assignment to Colors:

The C_CF$_{c,ch}$ is marked disabled (D), if for any CBSD assigned to color c, CU_Status$_{cbsd,ch}$="Disabled";

When possible, assign the channel unit ch to color c if:
C_CF$_{ch,c}$=0, i.e., the channel may be considered unrestricted with respect to CBSD power;
Otherwise, a channel should be assigned to a color which has the minimum constraining factor (i.e., minimum power reduction);

If desired, a color c can be re-enabled for channel unit ch if the CBSDs that have CU_Status$_{cbsd,ch}$="Disabled" are removed from the color group;
Handling of removed CBSDs is not specified in this disclosure.

The optimization criteria for channel assignments to colors is:

Min($\Sigma$(C_CF$_{c,ch}$)), for all pairs (c,ch).

FIG. 10 is an example of a constraining factor color matrix in accordance with the principles of the disclosure. In particular, FIG. 10 assumes four colors are used after graph coloring. In one or more embodiments, when using the table shown in FIG. 10 for channel selection, processing circuitry 18 assigns channels with a minimum value. The values shown in FIG. 10 such as 0, 5, 6, 7, etc. indicate an amount of power reduction in dB to be enforced on a CBSD if the CBSD is assigned a specific channel. For example, if a CBSD is assigned channel 3/color 2, the CBSD will have to reduced its power by 35 dB, whereas assigning the same CBSD to channel 4/color 2 will lead to no power reduction being imposed on the CBSD. Further, "D" denotes channels that are disable such that no CBSDs are assigned to channel/color combinations denoted as "D". In one or more embodiments, CBSDs are assigned channels that require a minimum amount of power reduction such as unrestricted channels ("0" dB).

Probabilistic Constraining Factor (P_CF)

Once the limits of the constraining factor for a CBSD on a particular channel are known (i.e., the lower limit is given by the I_CF and the upper limit is given by M_CF), a probabilistic constrained factor can be computed. P_CF will be a function that will include a probabilistic confidence in terms of a percentile x of the cumulative distribution function (cdf) for an ensemble of CF's, in which the CF is treated as a random variable. The P_CF will be dependent of the number of CBSDs that are using a certain channel ch. In other words, P_CF indicates the probability that the CF values are within a defined confidence interval.

Figure 11:
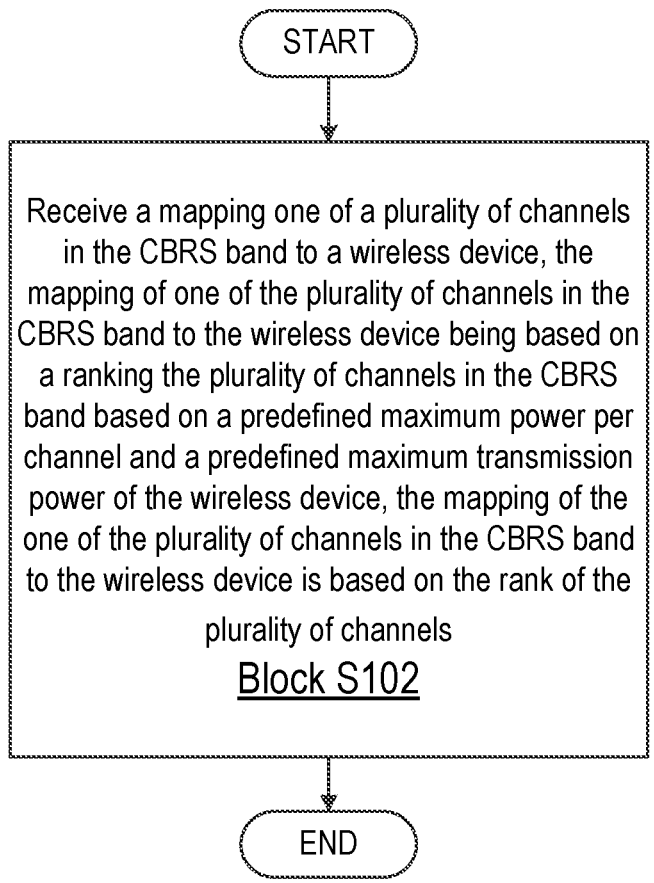
FIG. 11 is a flow diagram of an exemplary operation process of operation code in accordance with the principles of the disclosure.

FIG. 11 is a flow diagram of an exemplary process of assignment code 34 in accordance with the principles of the disclosure. Processing circuitry 28 is configured to receive a mapping of one of a plurality of channels in the CBRS band to a wireless device 14 where the mapping of one of the plurality of channels in the CBRS band to the wireless device 14 is based on a ranking the plurality of channels in the CBRS band that is based on a predefined maximum power per channel and a predefined maximum transmission power of the wireless device 14, as described herein (Block S102). In one or more embodiments, processing circuitry 28 is configured to receive an indication of a selected channel and associated constraint factor for CBRS operation. Processing circuitry 28 operates using the selected channel with a transmit power within the indicated constraint factor. For example, the transmit power of communication interface 26 and/or transmit of wireless device 14 is within the indicated constraint factor. In other words, network node 12 communicates the determined channel/configuration to wireless device 14 for implementation at wireless device 14.

Figure 13:
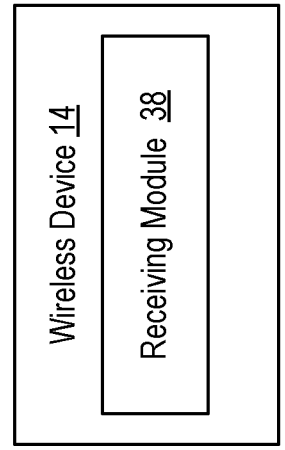
FIG. 13 is an alternative embodiment for wireless device in accordance with the principles of the disclosure.
Figure 12:
FIG. 12 is an alternative embodiment of network node in accordance with the principles of the disclosure.

FIG. 12 is an alternative embodiment of network node 12 in accordance with the principles of the disclosure. Network node 12 includes management module 36 for performing the determination as described above with respect to Block S100. FIG. 13 is an alternative embodiment for wireless device 14 in accordance with the principles of the disclosure. Wireless device 14 includes receiving module 40 for performing the receiving functions described above with respect to Block S102.

Some Embodiments

According to one embodiment of the disclosure, a network node 12 for channel assignment in a Citizens Broadband Radio Service, CBRS, band, the network node 12 comprising processing circuitry 18 configured to: map one of a plurality of channels in the CBRS band to a wireless device 14, the mapping of one of the plurality of channels in the CBRS band to the wireless device 14 including: ranking the plurality of channels in the CBRS band based on a predefined maximum power per channel and a predefined maximum transmission power of a wireless device 14.

According to one embodiment of this aspect, the processing circuitry 18 is further configured to determine one of a plurality of states of each of the plurality of channels based on the ranking, each state indicating whether the predefined maximum power of the wireless device 14 is allowed to be used in each of the plurality of channels. According to one embodiment of this aspect, the plurality of states include: an unrestricted state, the unrestricted state corresponds to a state where a transmission power of the wireless device 14 is allowed to equal the maximum power of the channel; a constrained state, the constrained state corresponds to a state where the transmission power of the wireless device 14 is allowed to equal a power less than the maximum power of the channel; and a disabled state, the disabled state corresponds to a state where the transmission power of the wireless device 14 is not allowed to exceed a predefined power limit.

According to one embodiment of this aspect, the rank defines a plurality of constraining factors indicating a usability of a channel for the wireless device 14, each constraining factor being associated with a value corresponding to a reduction in power from the maximum transmission power of the wireless device 14. According to one embodiment of this aspect, the plurality of constraining factors include an individual constraining factor that assumes the wireless device 14 is a citizens broadband radio service device, CBSD, and the only CBSD operating among interference protected entities. According to one embodiment of this aspect, the mapping of one of the plurality of channels in the CBRS band to the wireless device 14 further includes: determining sets of management connected sets of wireless devices 14 by: applying interference coordination groups, ICGs, to the wireless devices 14 associated with spectrum access system, SAS, connected sets; removing graph edges between wireless devices 14 in the same ICG; applying common channel groups, CCGs, to wireless devices 14 in the SAS connected sets; consolidating wireless devices 14 in the same CCGs into a graph vertex; and graph coloring the management connected sets at least in part by: mapping each vertex in the management connected set to a color; and mapping each wireless device 14 in the management connected set to a color.

According to one embodiment of this aspect, the plurality of constraining factors include a color constraining factor that assumes the wireless device 14 is a citizens broadband radio service device, CBSD, and the among several other CBSDs operating in a channel assigned to a color from the graph coloring. According to one embodiment of this aspect, the plurality of constraining factors include a worst-case constraining factor that assumes the wireless device 14 is a citizens broadband radio service device, CBSD, and the that the remaining CBSDs of the management connected sets are operating on a same channel of the plurality of channels.

According to another aspect of the disclosure, a method for a network node 12 for channel assignment in a Citizens Broadband Radio Service, CBRS, band is provided. One of a plurality of channels in the CBRS band is mapped to a wireless device 14. The mapping of one of the plurality of channels in the CBRS band to the wireless device 14 includes ranking the plurality of channels in the CBRS band based on a predefined maximum power per channel and a predefined maximum transmission power of a wireless device 14.

According to one embodiment of this aspect, one of a plurality of states of each of the plurality of channels is determined based on the ranking, each state indicating whether the predefined maximum power of the wireless device 14 is allowed to be used in each of the plurality of channels. According to one embodiment of this aspect, the plurality of states includes: an unrestricted state, the unrestricted state corresponds to a state where a transmission power of the wireless device 14 is allowed to equal the maximum power of the channel; a constrained state, the constrained state corresponds to a state where the transmission power of the wireless device 14 is allowed to equal a power less than the maximum power of the channel; and a disabled state, the disabled state corresponds to a state where the transmission power of the wireless device 14 is not allowed to exceed a predefined power limit.

According to one embodiment of this aspect, the rank defines a plurality of constraining factors indicating a usability of a channel for the wireless device 14, each constraining factor being associated with a value corresponding to a reduction in power from the maximum transmission power of the wireless device 14.

According to one embodiment of this aspect, the plurality of constraining factors include an individual constraining factor that assumes the wireless device 14 is a citizens broadband radio service device, CBSD, and the only CBSD operating among interference protected entities. According to one embodiment of this aspect, the mapping of one of the plurality of channels in the CBRS band to the wireless device 14 further includes: determining sets of management connected sets of wireless devices 14 by: applying interference coordination groups, ICGs, to the wireless devices 14 associated with spectrum access system, SAS, connected sets; removing graph edges between wireless devices 14 in the same ICG; applying common channel groups, CCGs, to wireless devices in the SAS connected sets; and consolidating wireless devices 14 in the same CCGs into a graph vertex. The mapping of one of the plurality of channels in the CBRS band to the wireless device 14 further includes: graph coloring the management connected sets at least in part by: mapping each vertex in the management connected set to a color; and mapping each wireless device 14 in the management connected set to a color.

According to one embodiment of this aspect, the plurality of constraining factors include a color constraining factor that assumes the wireless device 14 is a citizens broadband radio service device, CBSD, and the among several other CBSDs operating in a channel assigned to a color from the graph coloring. According to one embodiment of this aspect, the plurality of constraining factors include a worst-case constraining factor that assumes the wireless device 14 is a citizens broadband radio service device, CBSD, and the that the remaining CBSDs of the management connected sets are operating on a same channel of the plurality of channels.

According to another aspect of the disclosure, a wireless device 14 for channel assignment in a Citizens Broadband Radio Service (CBRS) band is provided. The wireless device 14 includes processing circuitry configured to: receive a mapping of one of a plurality of channels in the CBRS band to a wireless device 14. The mapping of one of the plurality of channels in the CBRS band to the wireless device 14 is based on a ranking the plurality of channels in the CBRS band that is based on a predefined maximum power per channel and a predefined maximum transmission power of the wireless device 14.

According to one embodiment of this aspect, the one of the plurality of channels is in one of a plurality of states based on the ranking, each state indicating whether the predefined maximum power of the wireless device 14 is allowed to be used in each of the plurality of channels. According to one embodiment of this aspect, the plurality of states includes: an unrestricted state, the unrestricted state corresponds to a state where a transmission power of the wireless device 14 is allowed to equal the maximum power of the channel; a constrained state, the constrained state corresponds to a state where the transmission power of the wireless device 14 is allowed to equal a power less than the maximum power of the channel; and a disabled state, the disabled state corresponds to a state where the transmission power of the wireless device 14 is not allowed to exceed a predefined power limit.

According to one embodiment of this aspect, the rank defines a plurality of constraining factors indicates a usability of a channel for the wireless device 14, each constraining factor being associated with a value corresponding to a reduction in power from the maximum transmission power of the wireless device 14. According to one embodiment of this aspect, the plurality of constraining factors include an individual constraining factor that assumes the wireless device is a citizens broadband radio service device, CBSD, and the only CBSD operating among interference protected entities.

According to one embodiment of this aspect, the mapping of one of the plurality of channels in the CBRS band to the wireless device 14 is based on: determining sets of management connected sets of wireless devices 14 by: applying interference coordination groups, ICGs, to the wireless devices 14 associated with spectrum access system, SAS, connected sets; removing graph edges between wireless devices 14 in the same ICG; applying common channel groups, CCGs, to wireless devices 14 in the SAS connected sets; and consolidating wireless devices 14 in the same CCGs into a graph vertex. The mapping further includes graph coloring the management connected sets at least in part by: mapping each vertex in the management connected set to a color; and mapping each wireless device 14 in the management connected set to a color. According to one embodiment of this aspect, the plurality of constraining factors include a color constraining factor that assumes the wireless device 14 is a citizens broadband radio service device, CBSD, and the among several other CBSDs operating in a channel assigned to a color from the graph coloring.

According to one embodiment of this aspect, the plurality of constraining factors include a worst-case constraining factor that assumes the wireless device 14 is a citizens broadband radio service device, CBSD, and the that the remaining CBSDs of the management connected sets are operating on a same channel of the plurality of channels. According to another embodiment of this aspect, a method for a wireless device 14 for channel assignment in a Citizens Broadband Radio Service, CBRS, band is provided. A mapping of one of a plurality of channels in the CBRS band to a wireless device 14 is received. The mapping of one of the plurality of channels in the CBRS band to the wireless device 14 is based on a ranking of the plurality of channels in the CBRS band that is based on a predefined maximum power per channel and a predefined maximum transmission power of the wireless device 14.

According to one embodiment of this aspect, the one of the plurality of channels is in one of a plurality of states based on the ranking, each state indicates whether the predefined maximum power of the wireless device 14 is allowed to be used in each of the plurality of channels. According to one embodiment of this aspect, the plurality of states includes: an unrestricted state, the unrestricted state corresponds to a state where a transmission power of the wireless device 14 is allowed to equal the maximum power of the channel; a constrained state, the constrained state corresponds to a state where the transmission power of the wireless device 14 is allowed to equal a power less than the maximum power of the channel; and a disabled state, the disabled state corresponds to a state where the transmission power of the wireless device 14 is not allowed to exceed a predefined power limit.

According to one embodiment of this aspect, the rank defines a plurality of constraining factors indicating a usability of a channel for the wireless device 14, each constraining factor being associated with a value corresponding to a reduction in power from the maximum transmission power of the wireless device 14. According to one embodiment of this aspect, the plurality of constraining factors include an individual constraining factor that assumes the wireless device 14 is a citizens broadband radio service device, CBSD, and the only CBSD operating among interference protected entities.

According to one embodiment of this aspect, the mapping of one of the plurality of channels in the CBRS band to the wireless device 14 is based on: determining sets of management connected sets of wireless devices 14 by: applying interference coordination groups, ICGs, to the wireless devices 14 associated with spectrum access system, SAS, connected sets; removing graph edges between wireless devices 14 in the same ICG; applying common channel groups, CCGs, to wireless devices 14 in the SAS connected sets; and consolidating wireless devices 14 in the same CCGs into a graph vertex. The mapping further includes graph coloring the management connected sets at least in part by: mapping each vertex in the management connected set to a color; and mapping each wireless device 14 in the management connected set to a color. According to one embodiment of this aspect, the plurality of constraining factors include a color constraining factor that assumes the wireless device 14 is a citizens broadband radio service device, CBSD, and the among several other CBSDs operating in a channel assigned to a color from the graph coloring. According to one embodiment of this aspect, the plurality of constraining factors include a worst-case constraining factor that assumes the wireless device 14 is a citizens broadband radio service device, CBSD, and the that the remaining CBSDs of the management connected sets are operating on a same channel of the plurality of channels.

According to another aspect of the disclosure, a network node 12 for channel assignment in a Citizens Broadband Radio Service, CBRS, band is provided. The network node 12 includes a mapping module configured to map one of a plurality of channels in the CBRS band to a wireless device 14, the mapping of one of the plurality of channels in the CBRS band to the wireless device 14 including: ranking the plurality of channels in the CBRS band based on a predefined maximum power per channel and a predefined maximum transmission power of a wireless device 14.

According to one embodiment of this aspect, a wireless device 14 for channel assignment in a Citizens Broadband Radio Service, CBRS, band is provided. The wireless device 14 includes a receiving module configured to receive a mapping of one of a plurality of channels in the CBRS band to a wireless device 14, the mapping of one of the plurality of channels in the CBRS band to the wireless device 14 being based on a ranking the plurality of channels in the CBRS band that is based on a predefined maximum power per channel and a predefined maximum transmission power of the wireless device 14.

Therefore, the disclosure introduces Constraining Factors for each channel of the CBSD to help in selecting the channel for CBSD operation. Constraining factors indicate the amount of power reduction imposed by incumbent protections. The actual constraining factor is dependent of the number of CBSDs using the same channel, which may be unknown during channel selection. As a substitute for the actual channel constraining factor, one or more other constraining factors are defined to gauge the usability of a channel.

| Abbreviation | Explanation |
|---|---|
| ASA | Authorized Shared Access |
| CBRS | Citizen's Broadband Radio Service |
| CBSD | Citizens Broadband Radio Service Device |
| CCG | Common Channel Group: A group of CBSDs, that are part of the same ICG, requiring a common primary channel assignment. The common primary channel assignment will be fulfilled by the CxM only for the CBSDs that have overlapping coverage. |
| CF | Constraining Factor |
| I_CF | Individual Constraining Factor |
| C_CF | Color Constraining Factor |
| M_CF | MAX Constraining Factor |
| P_CF | Probabilistic Constraining Factor |
| Connected Set | Set of CBSDs belonging to a connected component of a graph created at the SAS or CxM |
| CxG | Coexistence Group: A group of CBSDs that coordinate their own interference within the group according to a common interference management policy |
| CxM | Coexistence Manager: A logical entity responsible for managing coexistence between GAA users within a CxG in coordination with SAS, according to the common interference management policy |
| ESC | Environmental Sensing Capability |
| GAA | General Authorized Access |
| ICG | Interference coordination group |
| LSA | Licensed Shared Access |
| PAL | Priority Access License |
| PE | Protected Entity |
| PL | Path Loss |
| PPA | PAL Protection Area |
| RAT | Radio Access Technology |
| SAS: | Spectrum Access System |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for channel assignment in a Citizens Broadband Radio Service, CBRS, band, the network node comprising processing circuitry configured to:
   map one of a plurality of channels in the CBRS band to a wireless device, the mapping of one of the plurality of channels in the CBRS band to the wireless device including:
      ranking the plurality of channels in the CBRS band based on a predefined maximum power per channel and a predefined maximum transmission power of a wireless device.

2. The network node of claim 1, wherein the processing circuitry is further configured to determine one of a plurality of states of each of the plurality of channels based on the ranking, each state indicating whether the predefined maximum power of the wireless device is allowed to be used in each of the plurality of channels.

3. The network node of claim 2, wherein the plurality of states include:
   an unrestricted state, the unrestricted state corresponds to a state where a transmission power of the wireless device is allowed to equal the maximum power of the channel;
   a constrained state, the constrained state corresponds to a state where the transmission power of the wireless device is allowed to equal a power less than the maximum power of the channel; and
   a disabled state, the disabled state corresponds to a state where the transmission power of the wireless device is not allowed to exceed a predefined power limit.

4. The network node of claim 1, wherein the ranking defines a plurality of constraining factors indicating a usability of a channel for the wireless device, each constraining factor being associated with a value corresponding to a reduction in power from the maximum transmission power of the wireless device.

5. The network node of claim 4, wherein the plurality of constraining factors include an individual constraining factor that assumes the wireless device is a citizens broadband radio service device, CBSD, and an only CBSD operating among interference protected entities.

6. The network node of claim 4, wherein the mapping of one of the plurality of channels in the CBRS band to the wireless device further includes:
   determining sets of management connected sets of wireless devices by:
      applying interference coordination groups, ICGs, to the wireless devices associated with spectrum access system, SAS, connected sets;
      removing graph edges between wireless devices in the same ICG;
      applying common channel groups, CCGs, to wireless devices in the SAS connected sets; and
      consolidating wireless devices in the same CCGs into a graph vertex; and
   graph coloring the management connected sets at least in part by:
      mapping each vertex in the management connected set to a color; and
      mapping each wireless device in the management connected set to a color.

7. The network node of claim 6, wherein the plurality of constraining factors include a color constraining factor that assumes the wireless device is a citizens broadband radio service device, CBSD, and assumes the wireless device is among several other CBSDs operating in a channel assigned to a color from the graph coloring.

8. The network node of claim 6, wherein the plurality of constraining factors include a worst-case constraining factor that assumes the wireless device is a citizens broadband radio service device, CBSD, and that the remaining CBSDs of the management connected sets are operating on a same channel of the plurality of channels.

9. A method for a network node for channel assignment in a Citizens Broadband Radio Service, CBRS, band, the method comprising:
   mapping one of a plurality of channels in the CBRS band to a wireless device, the mapping of one of the plurality of channels in the CBRS band to the wireless device including:
      ranking the plurality of channels in the CBRS band based on a predefined maximum power per channel and a predefined maximum transmission power of a wireless device.

10. The method of claim 9, further comprising determining one of a plurality of states of each of the plurality of channels based on the ranking, each state indicating whether the predefined maximum power of the wireless device is allowed to be used in each of the plurality of channels.

11. The method of claim 10, wherein the plurality of states includes:
   an unrestricted state, the unrestricted state corresponds to a state where a transmission power of the wireless device is allowed to equal the maximum power of the channel;
   a constrained state, the constrained state corresponds to a state where the transmission power of the wireless device is allowed to equal a power less than the maximum power of the channel; and
   a disabled state, the disabled state corresponds to a state where the transmission power of the wireless device is not allowed to exceed a predefined power limit.

12. The method of claim 9, wherein the ranking defines a plurality of constraining factors indicating a usability of a channel for the wireless device, each constraining factor being associated with a value corresponding to a reduction in power from the maximum transmission power of the wireless device.

13. The method of claim 12, wherein the plurality of constraining factors include an individual constraining factor that assumes the wireless device is a citizens broadband radio service device, CBSD, and an only CBSD operating among interference protected entities.

14. The method of claim 12, wherein the mapping of one of the plurality of channels in the CBRS band to the wireless device further includes:
   determining sets of management connected sets of wireless devices by:
      applying interference coordination groups, ICGs, to the wireless devices associated with spectrum access system, SAS, connected sets;
      removing graph edges between wireless devices in the same ICG;
      applying common channel groups, CCGs, to wireless devices in the SAS connected sets; and
      consolidating wireless devices in the same CCGs into a graph vertex; and
   graph coloring the management connected sets at least in part by:
      mapping each vertex in the management connected set to a color; and mapping each wireless device in the management connected set to a color.

15. The method of claim 14, wherein the plurality of constraining factors include a color constraining factor that assumes the wireless device is a citizens broadband radio service device, CBSD, and assumes the wireless device is among several other CBSDs operating in a channel assigned to a color from the graph coloring.

16. The method of claim 14, wherein the plurality of constraining factors include a worst-case constraining factor that assumes the wireless device is a citizens broadband radio service device, CBSD, and that the remaining CBSDs of the management connected sets are operating on a same channel of the plurality of channels.

17. A wireless device for channel assignment in a Citizens Broadband Radio Service (CBRS) band, the wireless device comprising processing circuitry configured to:
receive a mapping of one of a plurality of channels in the CBRS band to a wireless device, the mapping of one of the plurality of channels in the CBRS band to the wireless device being based on a ranking of the plurality of channels in the CBRS band that is based on a predefined maximum power per channel and a predefined maximum transmission power of the wireless device.

18. The wireless device of claim 17, wherein the one of the plurality of channels is in one of a plurality of states based on the ranking, each state indicating whether the predefined maximum power of the wireless device is allowed to be used in each of the plurality of channels.

19. The wireless device of claim 18, wherein the plurality of states includes:
an unrestricted state, the unrestricted state corresponds to a state where a transmission power of the wireless device is allowed to equal the maximum power of the channel;
a constrained state, the constrained state corresponds to a state where the transmission power of the wireless device is allowed to equal a power less than the maximum power of the channel; and
a disabled state, the disabled state corresponds to a state where the transmission power of the wireless device is not allowed to exceed a predefined power limit.

20. The wireless device of claim 17, wherein the ranking defines a plurality of constraining factors indicating a usability of a channel for the wireless device, each constraining factor being associated with a value corresponding to a reduction in power from the maximum transmission power of the wireless device.

21. The wireless device of claim 20, wherein the plurality of constraining factors include an individual constraining factor that assumes the wireless device is a citizens broadband radio service device, CBSD, and an only CBSD operating among interference protected entities.

22. The wireless device of claim 20, wherein the mapping of one of the plurality of channels in the CBRS band to the wireless device is based on:
determining sets of management connected sets of wireless devices by:
applying interference coordination groups, ICGs, to the wireless devices associated with spectrum access system, SAS, connected sets;
removing graph edges between wireless devices in the same ICG;
applying common channel groups, CCGs, to wireless devices in the SAS connected sets; and
consolidating wireless devices in the same CCGs into a graph vertex; and
graph coloring the management connected sets at least in part by:
mapping each vertex in the management connected set to a color; and
mapping each wireless device in the management connected set to a color.

23. The wireless device of claim 22, wherein the plurality of constraining factors include a color constraining factor that assumes the wireless device is a citizens broadband radio service device, CBSD, and assumes the wireless device is among several other CBSDs operating in a channel assigned to a color from the graph coloring.

24. The wireless device of claim 22, wherein the plurality of constraining factors include a worst-case constraining factor that assumes the wireless device is a citizens broadband radio service device, CBSD, and that the remaining CBSDs of the management connected sets are operating on a same channel of the plurality of channels.

25. A method for a wireless device for channel assignment in a Citizens Broadband Radio Service, CBRS, band, the method comprising:
receiving a mapping of one of a plurality of channels in the CBRS band to a wireless device, the mapping of one of the plurality of channels in the CBRS band to the wireless device being based on a ranking of the plurality of channels in the CBRS band that is based on a predefined maximum power per channel and a predefined maximum transmission power of the wireless device.

26. The method of claim 25, wherein the one of the plurality of channels is in one of a plurality of states based on the ranking, each state indicating whether the predefined maximum power of the wireless device is allowed to be used in each of the plurality of channels.

27. The method of claim 26, wherein the plurality of states includes:
an unrestricted state, the unrestricted state corresponds to a state where a transmission power of the wireless device is allowed to equal the maximum power of the channel;
a constrained state, the constrained state corresponds to a state where the transmission power of the wireless device is allowed to equal a power less than the maximum power of the channel; and
a disabled state, the disabled state corresponds to a state where the transmission power of the wireless device is not allowed to exceed a predefined power limit.

28. The method of claim 25, wherein the ranking defines a plurality of constraining factors indicating a usability of a channel for the wireless device, each constraining factor being associated with a value corresponding to a reduction in power from the maximum transmission power of the wireless device.

29. The method of claim 28, wherein the plurality of constraining factors include an individual constraining factor that assumes the wireless device is a citizens broadband radio service device, CBSD, and an only CBSD operating among interference protected entities.

30. The method of claim 28, wherein the mapping of one of the plurality of channels in the CBRS band to the wireless device is based on:
determining sets of management connected sets of wireless devices by:

applying interference coordination groups, ICGs, to the wireless devices associated with spectrum access system, SAS, connected sets;
removing graph edges between wireless devices in the same ICG;
applying common channel groups, CCGs, to wireless devices in the SAS connected sets; and
consolidating wireless devices in the same CCGs into a graph vertex; and
graph coloring the management connected sets at least in part by:
mapping each vertex in the management connected set to a color; and
mapping each wireless device in the management connected set to a color.

31. The method of claim 30, wherein the plurality of constraining factors include a color constraining factor that assumes the wireless device is a citizens broadband radio service device, CBSD, and assumes the wireless device is among several other CBSDs operating in a channel assigned to a color from the graph coloring.

32. The method of claim 30, wherein the plurality of constraining factors include a worst case constraining factor that assumes the wireless device is a citizens broadband radio service device, CBSD, and that the remaining CBSDs of the management connected sets are operating on a same channel of the plurality of channels.

* * * * *